US009527771B2

(12) United States Patent
Crews et al.

(10) Patent No.: US 9,527,771 B2
(45) Date of Patent: Dec. 27, 2016

(54) ELECTROLYTIC COMPOSITE MATERIALS

(71) Applicants: James B. Crews, Willis, TX (US); Othon Rego Monteiro, Houston, TX (US)

(72) Inventors: James B. Crews, Willis, TX (US); Othon Rego Monteiro, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 784 days.

(21) Appl. No.: 13/680,311

(22) Filed: Nov. 19, 2012

(65) Prior Publication Data
US 2013/0152824 A1    Jun. 20, 2013

Related U.S. Application Data

(60) Provisional application No. 61/576,462, filed on Dec. 16, 2011.

(51) Int. Cl.
| | |
|---|---|
| *C04B 28/00* | (2006.01) |
| *C04B 14/34* | (2006.01) |
| *C04B 20/10* | (2006.01) |
| *E21B 33/13* | (2006.01) |
| *C09K 8/42* | (2006.01) |

(52) U.S. Cl.
CPC ............. *C04B 28/006* (2013.01); *C04B 14/34* (2013.01); *C09K 8/42* (2013.01); *E21B 33/13* (2013.01); *Y02P 40/165* (2015.11)

(58) Field of Classification Search
None
See application file for complete search history.

(56) References Cited

U.S. PATENT DOCUMENTS

| | | | | |
|---|---|---|---|---|
| 4,349,386 | A | | 9/1982 | Davidovits |
| 4,421,799 | A | * | 12/1983 | Novinski ................. C23C 4/06 427/217 |
| 5,206,191 | A | * | 4/1993 | Alary ...................... C04B 35/01 106/38.3 |
| 7,347,896 | B2 | * | 3/2008 | Harrison ................. C04B 28/04 106/685 |
| 7,794,537 | B2 | | 9/2010 | Barlet-Gouedard et al. |
| 2005/0096207 | A1 | * | 5/2005 | Urbanek ............. C04B 33/1328 501/6 |
| 2012/0024109 | A1 | * | 2/2012 | Xu ........................... B22F 1/025 75/243 |

OTHER PUBLICATIONS

"Geopolymer, Green Chemistry and Sustainable Development Solutions" Ed. Joseph Davidovits. pp. 10. 2005.*
Davidovits, Joseph. "30 Years of Successes and Failures in Geopolymer Applications Market Trends and Potential Breakthroughs". Geopolymer Conference. 2002. Retrieved from http://www.geopolymer.org/fichiers_pdf/30YearsGEOP.pdf.*
Shamhashiri. "Ethanol". Feb. 5, 2009. Retrieved from http://www.scifun.org/chemweek/pdf/ethanol.pdf.*
"Effects of Alloying Components". Magnesium Alloys Encyclopedia. Nov. 6, 2006. Retrieved from https://web.archive.org/web/20061106160115/http://www.magnesium.com/w3/data-bank/article.php?mgw=7&magnesium=183.*
Shaw, Barbara A. "Corrosion Resistance of Magnesium Alloys". ASM Handbook. vol. 13 A Corrosion Fundamentals. Retrieved from http://www.asminternational.org/documents/10192/1849770/06494G_Chapter_Sample.pdf.*
A. Palomo et al., "Alkali-activated Fly Ashes: A Cement for the Future," Cement and Concrete Research 29, (1999), 1323-1329.
Geopolymer Institute, [online]; [retrieved Jan. 5, 2012]; retrieved from the internet http://www.geopolymer.org/science/about-geopolymerization, "About geopolymerization," Geopolymer Institute, 1996-2011, 2 pages.
Frantisek Skvara; "Alkali-activated Materials or Geopolymer?"; Cramics-Silikaty 51 (3) 173-177 (2007); Lecture, http://www.geopolymery.eu/aitom/ipload/documents/publikace/2007/2007_03_173.pdf, pp. 173-176.
Concrete Pavement Technology Program, "Geopolymer Concrete"; TechBrief. Mar. 2010; FHWA-HIF-10-014; U.S. Dept of Transportation, Federal Highway Administration; http://www.fhwa.dot.gov/pavement/concrete/pubs/hif10014/hif10014.pdf, pp. 1-4.
Open Source Ecology, [online]; [retrieved on Jan. 5, 2012]; retrieved from the Internet http://opensourceecology.org/wiki/Geopolymers, "Geopolymers," 4 pages.
P. Duxson et al., "Geopolymer technology: the current state of the art", Journal of Material Science (2007) 42:2917-2933.
Geopolymer Institute, [online]; [retrieved on Jan. 5, 2012]; retrieved from the Internet http://www.geopolymer.org/science/introduction, "What is a geopolymer? Introduction", Geopolymer Institute, 1996-2011, 1 page.

* cited by examiner

*Primary Examiner* — Jun Li
*Assistant Examiner* — Karam Hijji
(74) *Attorney, Agent, or Firm* — Cantor Colburn LLP

(57) ABSTRACT

A composition comprising a metallic composition, an inorganic oxide-based polymer, and a solvent. A cure product of the metallic composition, inorganic oxide-based polymer, and solvent, the cure product having a network structure, are also disclosed.

26 Claims, No Drawings

ELECTROLYTIC COMPOSITE MATERIALS

CROSS REFERENCE TO RELATED APPLICATIONS

This application claims the benefit of an earlier filing date from U.S. Provisional Application Ser. No. 61/576,462 filed Dec. 16, 2011, the entire disclosure of which is incorporated herein by reference.

BACKGROUND

Inorganic materials have long been used in industrial and construction applications. For example, a typical inorganic material used for construction purpose is Portland cement. However, materials such as Portland cement require significant amounts of energy to produce and cure, and in some applications can possess a lower degree of durability than would otherwise be desired. One potential improvement to the limitations of such typical materials includes use of geopolymer technology, including for applications such as construction and highway applications.

Geopolymers themselves include inorganic polymers based on inexpensive mineral or mineral-derived materials such as silicas, silicates, aluminosilicates, etc. and are of interest because such materials can be cured by action of alkali and form stable networks that provide a higher degree of strength and interconnectivity, and hence improved durability and longevity. In addition, geopolymer technology requires less energy and has lower associated generation of by-products such as carbon dioxide. For example, while materials such as silicates have been used in inorganic materials such as cements as a reinforcement, materials such as alkali-activated slags have been used as cements.

There remains a need, however, for geopolymer compositions with broader compositional range and which can be controlled compositionally to provide improved cure properties, and improved mechanical properties for the cured product.

SUMMARY

The above and other deficiencies of the prior art are overcome by, in an embodiment, a composition comprising a metallic composition, an inorganic oxide-based polymer, and a solvent.

In another embodiment, a composition comprises a cure product of a metallic composition, a inorganic oxide-based polymer, and a solvent, the cure product having a network structure.

In another embodiment, a network material comprises a concrete material comprising a cure product of a metallic composition, an inorganic oxide-based polymer, and a solvent, the cure product having a network structure.

DETAILED DESCRIPTION

Disclosed herein are inorganic oxide based polymeric materials having unique curing and compositional properties, based on a composite of a magnesium alloy composition and an inorganic oxide-based polymer, such as silica. Use of such magnesium alloy provides a controlled decomposition and hence reaction progress, and provides a source of ionic materials such as magnesium hydroxide, calcium hydroxide and aluminum oxides and hydroxides useful for catalyzing the condensation of the inorganic oxide-based polymer, and (in the case of aluminum species for example) providing a source of reactant or cross-linking agent for forming an inorganically linked network structure.

Thus, in an embodiment, an inorganic oxide-based polymer composition comprises a magnesium alloy-composition, and an inorganic oxide-based polymer.

The metallic composition comprises a magnesium alloy. The magnesium alloy includes magnesium or any magnesium alloy that is dissolvable in a corrosive environment including those typically encountered downhole, such as an aqueous environment which includes formation water, seawater, salt (i.e., brine), completion brine, stimulation treatment fluid, remedial cleanup treatment fluid, or an acidic or corrosive agent such as hydrogen sulfide, hydrochloric acid, or other such corrosive agents, or combinations thereof. Magnesium alloys suitable for use include alloys of magnesium with aluminum (Al), cadmium (Cd), calcium (Ca), cobalt (Co), copper (Cu), iron (Fe), lithium, (Li), manganese (Mn), nickel (Ni), potassium (K), silicon (Si), silver (Ag), sodium (Na), strontium (Sr), thorium (Th), tin (Sb), titanium, (Ti), tungsten (W), zinc (Zn), zirconium (Zr), or a combination comprising at least one of the foregoing. Alloying or trace elements can be included in varying amounts to adjust the corrosion rate of the magnesium. For example, four of these elements (cadmium, calcium, silver, and zinc) have to mild-to-moderate accelerating effects on corrosion rates, whereas four others (copper, cobalt, iron, and nickel) have a still greater effect on corrosion. Exemplary commercial magnesium alloys which include different combinations of the above alloying elements to achieve different degrees of corrosion resistance include but are not limited to, for example, those alloyed with aluminum, strontium, and manganese such as AJ62, AJ50x, AJ51x, and AJ52x alloys, and those alloyed with aluminum, zinc, and manganese such as AZ91A-E alloys.

The metallic composition may also comprise a calcium alloy. The calcium alloy includes calcium or any calcium alloy that is dissolvable in a corrosive environment including those typically encountered downhole, such as an aqueous environment which includes salt (i.e., brine), or an acidic or corrosive agent such as hydrogen sulfide, hydrochloric acid, or other such corrosive agents, or combinations thereof. Calcium alloys suitable for use include alloys of calcium with aluminum (Al), cadmium (Cd), cobalt (Co), copper (Cu), iron (Fe), lithium, (Li), magnesium (Mg), manganese (Mn), nickel (Ni), potassium, (K), silicon (Si), silver (Ag), sodium (Na), strontium (Sr), thorium (Th), tin (Sb), titanium, (Ti), tungsten (W), zinc (Zn), zirconium (Zr), or a combination comprising at least one of the foregoing. Alloying or trace elements can be included in varying amounts to adjust the corrosion rate of the calcium. For example, four of these elements (cadmium, magnesium, silver, and zinc) have to mild-to-moderate accelerating effects on corrosion rates, whereas four others (copper, cobalt, iron, and nickel) have a still greater effect on corrosion. Exemplary commercial calcium alloys that include different combinations of the above alloying elements to achieve different degrees of corrosion resistance include but are not limited to, for example, those alloyed with aluminum and silica, such as AL2013-T3 and AL2014-T2, available from Stanford Materials.

In an embodiment, the magnesium-alloy or calcium-alloy particles are coated with one or more layers. In one embodiment, these particles have a core-shell structure, in which the core comprises a magnesium alloy and the shell comprises an aluminum alloy. The shell layer is not identical to the core. The function of the shell is to affect the rate of the dissolution of the core material by accelerating or decelerating the rate based on the relative difference in galvanic potential between the core and shell.

In another embodiment, the metallic particles are coated. Useful coated metallic particles include those described in co-pending U.S. Patent Application Publication No. 2011/0135953 A1, filed on Dec. 8, 2009, and in co-pending U.S. patent application Ser. Nos. 13/220,824, 13/220,832 and 13/220,822 each filed on Aug. 30, 2011, each of which is incorporated herein by reference in its entirety. These applications describe coated metallic particles having nanoscale coatings (e.g., about 5 nm to about 2,500 nm) of Al, Zn, Zr, Mn, Mg, Mo, Ni, Ti, Fe, Cu, Si, Ca or Sn, or an oxide, carbide or nitride thereof, or a cermet thereof, or a combination of any of the aforementioned materials, wherein the coating layer has a chemical composition and the particle core has a chemical composition that is different than the chemical composition of the coating layer.

Alloys having corrosion rates different than those of the above exemplary alloys are also useful. For example, nickel has been found to be useful in decreasing the corrosion resistance (i.e., increasing the corrosion rate) of magnesium alloys when included in small amounts (i.e., less than 1% by weight). For example, the nickel content of a magnesium alloy is less than or equal to about 0.5 wt %, specifically less than or equal to about 0.4 wt %, and more specifically less than or equal to about 0.3 wt %, in some embodiments.

In an embodiment, the magnesium alloy is provided as a powder having a particle size of from about 5 nanometer (nm) to about 4 millimeters (mm), and more specifically about 10 nm to about 1 mm. The powder is further coated using a method such as chemical vapor deposition, physical vapor deposition, wet-chemical deposition, electrochemical deposition, electroless deposition, or the like, or admixed by physical method such cryo-milling, ball milling, or the like, with a metal mixture of metals such as Al, Ca, Mg, Mn, Zn, Zr, Mo, Si, Re, Ni, W, Co, Cu, Fe, or oxides, carbides, nitrides of one of these metals, or a combination of any of the aforementioned materials, or the like.

In an alternate embodiment, the magnesium alloy composition is a particle comprising a magnesium particle interdispersed with an aluminum-containing coating. As used herein, "inter-dispersed" mean that two or more adjacent layers (e.g., a core of a magnesium alloy and an aluminum coating) interpenetrate into or through each other in intimate admixture, where it will be appreciated that two (or more) inter-dispersed layers have, on average, a compositional gradient due to the interpenetration of one layer into the adjacent layer. The magnesium alloy material has a corrosion rate of about 0.1 to about 200 mg/cm$^2$/hour, specifically about 1 to about 150 mg/cm$^2$/hour determined in aqueous 3 wt % KCl solution at 200° F. (93° C.).

The magnesium-aluminum composition further includes an oxide of one or more of the metals included in the magnesium-aluminum composition. For example, where the core comprises a magnesium-aluminum alloy, oxides of calcium (such as quicklime), magnesium (such as magnesia), aluminum (such as alumina), or a combination comprising at least one of the foregoing are present.

The inorganic oxide based composition further includes an inorganic oxide-based polymer. In an embodiment, the inorganic oxide-based polymer comprises a plurality of structural repeating units —(X—O)— where X is Si, Al, P, or a combination comprising at least one of the foregoing.

In an embodiment, useful inorganic oxide based polymers include structural repeating units including, for example, —Si—O—Si—O— (polysiloxo) chains, —Si—O—Al—O— (polysialate) chains, —Si—O—Al—O—Si—O— (polysialate-siloxo) chains, —Si—O—Al—O—Si—O—Si—O— (polysialate-disiloxo) chains, P—O—P—O— (polyphosphate) chains, —P—O—Si—O—P—O— (polyphosphate-phosphosiloxo) chains, —P—O—Si—O—Al—O—P—O (polyphosphosialate), —(R)—Si—O—Si—O—(R)— (polyorganosiloxo) chains, a combination comprising at least one of the foregoing. Exemplary inorganic oxide-based polymer includes, in some embodiments, silica, alumina, zirconia, phosphate, or a combination comprising at least one of the foregoing units. Typical such silica-containing materials include water glass, silica sol, fumed silica, clay, slag, zeolites, bauxite, fly ash, silicate minerals, aluminosilicate minerals, diatomaceous earth, or a combination comprising at least one of the foregoing. The inorganic based polymer has a number averaged particle size of 5 nm to 10 mm.

Exemplary materials having such structures include silica-based water glass geopolymers, such as polysiloxonates including those that are substantially water soluble (i.e., having a solubility of greater than or equal to about 1% by weight); polysilalates such as kaolinite or hydrxoysodalite geopolymers having a 1:1 molar ratio of Si to Al; polysialate-siloxo geopolymers such as metakaolin MK-750 based geopolymers having a 2:1 molar ratio of Si to Al; calcium-based geopolymers (including Ca, Na, and K) having an Si to Al ratio of 1, 2, or 3:1; rock-based geopolymers including polysialate-multisiloxo polymers having an Si to Al ratio of about 1:1 to about 1:10; silica-based geopolymers having siloxo and sialate linking groups in a polysiloxonate with an Si to Al ratio of about 10:1 or greater; fly-ash based geopolymers, derived from the combustion of silicate/aluminate containing materials such as impure coals; phosphate-based geopolymers; and organic-mineral-based geopolymers including synthetic hybrids of organic groups linking siloxo or silicate groups.

The inorganic oxide-based composition includes the magnesium alloy composition and the inorganic-oxide based polymer in a weight ratio of about 0.1:99.9 to about 99.9:0.1, in an embodiment, 1:99 to about 99:1, and in an embodiment, 10:90 to about 90:10 based on the total weight of magnesium alloy composition and inorganic-oxide based polymer.

The inorganic oxide-based polymer composition further includes a solvent. The solvent is aqueous or non-aqueous. In an embodiment, the solvent comprises water; alcohols including $C_{1-20}$ alcohols, diols, or polyols including methanol, ethanol, isopropanol, ethylene glycol, propylene glycol, glycerol, diethylene glycol, poly(ethylene glycol), poly(ethylene-propylene) glycol, and the like; surfactants; dispersants; water-miscible polar aprotic solvents such as dimethylsulfoxide, N,N-dimethylformamide, gamma butyrolactone, N-methylpyrrolidone, and the like; ionic liquids including those based on, for example, N,N-dialkylimidazolium salts; or a combination comprising at least one of the foregoing. The solvent where aqueous can be adjusted for pH by addition of, for example, mineral acids such as hydrochloric acid, sulfuric acid, and nitric acid; bases including sodium hydroxide, potassium hydroxide, magnesium hydroxide, calcium hydroxide, sodium carbonate, and the like; buffers including alkali salts of weak acids such as formic acid, acetic acid, citric acid, and the like, and sulfonic acids. In an embodiment, the composition is aqueous and has a pH of greater than about 6, in another embodiment, has a pH of greater than about 7, and in another embodiment, has a pH of greater that about 8, and in another embodiment, has a pH of greater than about 9. The aqueous fluid optionally contains an inorganic salt, such as NaCl, KCl, $CaCl_2$, MgCl$_2$, CaBr$_2$, ZnBr$_2$, NaBr, and the like, and a combination comprising at least one of the foregoing.

In an embodiment, the inorganic oxide-based composition comprises the magnesium alloy-composition in an amount of about 0.1 to about 90 wt %, and the inorganic oxide-based polymer in an amount of about 0.1 to about 90 wt %, each based on the total weight of the composition.

Additional components can be utilized to improve the performance properties and range of applicability. For example, thickeners, curing agents, catalysts, retarders, surfactants, thixotropic agents, extenders, fillers, weighting agents, defoamers, salts, additional solvents, and the like can also be included. In one non-limiting example the thixotropic agent is calcium sulfate.

In an embodiment, the composition is curable. It will be understood that cure of silicate and aluminate type materials includes the condensation of two silanol groups and/or aluminum hydroxide groups, or a combination silanol and aluminum hydroxide groups, to form a, M-O-M link, where M is Si, Al, P, etc. Because silicates have more than one silanol per monomeric unit, it is possible to form a cross-linked network material upon cure of silicates with one another. Furthermore, the action of the magnesium-aluminum alloy in the presence of downhole fluids such as brine, or acid, is one of controlled electrolysis based on the composition of the magnesium-aluminum composition. By this decomposition, aluminum oxides and hydroxides, or those of other metals present in the magnesium-aluminum alloy, are generated in the presence of the silica or silicates, and can act as cross-linkers and co-condensates with the silica. Further, the presence of hydroxides generated by the electrolysis of the magnesium catalyzes the condensation of the silica-alumina precursor materials. In this way, the magnesium-aluminum metallic composition acts as a compositional control with respect to aluminum content, and as a way of introducing a rate control based on the relative amount of magnesium-aluminum composition to inorganic oxide-based polymer.

Thus, a cured material comprises the cure product of the inorganic oxide-based composition. In an embodiment, the inorganic oxide-based composition comprises the cure product of a magnesium-aluminum metallic composition, an inorganic oxide-based polymer, and a solvent, the cure product having a network structure. As used herein "network structure" means that collectively the silicate/aluminate/phosphate units form a branched, interconnected lattice structure. The structure can be solid, or template around inclusions such as pore-generating materials including salts that can be removed by washing, or porogens (such as poly(ethylene-co-propylene) polymers, cyclodextrins, and the like) which can be removed by thermal or chemical degradation and diffusion or removal of the degradation products to provide pores of controlled size in the polymer matrix. Porosity may be also formed by distribution of hydrogen gas generated from the magnesium-aluminum alloy decomposition. The composition is curable at temperatures of less than or equal to about 300° C., in an embodiment, less than or equal to 200° C., and in another embodiment, less than or equal to 100° C.

In another embodiment, a method of forming a cured geopolymer composition, comprises combining a magnesium-aluminum metallic composition, a inorganic oxide-based polymer, and a solvent; and curing the combination to form a network material.

The inorganic oxide-based composition is thus useful for any application requiring a network structure, including, synthetic cement, or can provide porous media with a zeolite-like micro or nanostructure. In an embodiment, the cured material is a concrete material.

In an embodiment, a method for forming a concrete material includes disposing a composition in an environment, disposing a solvent in the environment, and contacting the composition with the solvent. The composition includes a metallic composition and an inorganic oxide-based polymer. The composition is thus cured to form the concrete material, which comprises the crosslinked product of the inorganic oxide-based polymer. The concrete material can thus have a network structure. The environment can be a downhole environment, surface environment, building environment, aquatic environment, or a combination comprising at least one of the foregoing environments. Examples of the downhole environment include a casing, frac pore, production zone, and the like. A building environment includes walls, floors, ceiling, basements, foundations, and the like. A surface environment includes platforms, sidewalks, equipment supports, and the like. Exemplary aquatic environments include pools of water, ocean, ponds, rivers, and the like. Here, the concrete material can be a structural material, decorative material, supporting material, membrane material, porous material, filter material, or a combination thereof.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:
1. A composition, comprising:
a metallic composition comprising a particle having a core surrounded by a shell, the core comprising a magnesium alloy and the shell comprising a metallic or ceramic layer not identical to the magnesium alloy, the magnesium alloy comprising magnesium metal alloyed with Al, Cd, Ca, Co, Cu, Fe, K, Li, Mn, Na, Ni, Si, Ag, W, Sb, Sr, Ti, Th, Zn, Zr, or a combination comprising at least one of the foregoing,
an inorganic oxide-based polymer, the inorganic oxide-based polymer comprising a plurality of structural repeating units which comprise —(X—O)— where X is Si, Al, P, or a combination comprising at least one of the foregoing, and
a solvent.

2. The composition of claim 1, wherein the shell comprises Al metal alloyed with Co, Cu, Fe, Mn, Mo, Mg, Si, Ti, W, Zn, or Zr, or a combination comprising at least one of the foregoing materials.

3. The composition of claim 1, wherein the particle has a number average particle size of from about 5 nm to about 4 mm.

4. The composition of claim 1, wherein the metallic composition is a particle comprising a magnesium alloy core interdispersed with an aluminum-containing shell.

5. The composition of claim 4, wherein the aluminum-containing shell comprises aluminum metal and one or more of oxides of aluminum or oxides of magnesium.

6. The composition of claim 1, wherein the inorganic oxide-based polymer comprises silica, alumina, or phosphate, or a combination comprising at least one of the foregoing units.

7. The composition of claim 1, wherein the inorganic oxide-based polymer comprises a structural repeating unit which comprises —Si—O—Si—O— (polysiloxo) chains, —Si—O—Al—O— (polysialate) chains, —Si—O—Al—O—Si—O— (polysialate-siloxo) chains, —Si—O—Al—O—Si—O—Si—O— (polysialate-disiloxo) chains, P—O—P—O— (polyphosphate) chains, —P—O—Si—O—P—O— (polyphosphate-phosphosiloxo) chains, —P—O—Si—O—Al—O—P—O (polyphosphosialate), —(R)—Si—O—Si—O—(R)— (polyorganosiloxo) chains, a combination comprising at least one of the foregoing.

8. The composition of claim 1, wherein the polymer comprises water glass, silica sol, fumed silica, clay, slag, fly ash, silicate minerals, aluminosilicate minerals, diatomaceous earth, or a combination comprising at least one of the foregoing.

9. The composition of claim 1, wherein the solvent is aqueous or non-aqueous.

10. The composition of claim 1, wherein the solvent comprises water, alcohol, water-miscible polar protic solvents, ionic liquids, or a combination comprising at least one of the foregoing.

11. The composition of claim 1, wherein the composition is aqueous and has a pH of greater than 6.

12. The composition of claim 1, comprising the metallic composition in an amount of about 0.1 to about 90 wt %, and the inorganic oxide-based polymer in an amount of about 0.1 to about 90 wt %, each based on the total weight of the composition.

13. The composition of claim 1, wherein the metallic composition and the inorganic-oxide based polymer are present in a weight ratio of 0.1:99.9 to 99.9:0.1, based on the total weight of metallic composition and inorganic-oxide based polymer.

14. The composition of claim 1, the composition being curable to form a network material.

15. A cured material comprising the cure product of the composition of claim 1.

16. A composition, comprising a cure product of:
a metallic composition comprising a particle having a core surrounded by a shell, the core comprising a magnesium alloy and the shell comprising a metallic or ceramic layer not identical to the magnesium alloy, the magnesium alloy comprising magnesium metal alloyed with Al, Cd, Ca, Co, Cu, Fe, K, Li, Mn, Na, Ni, Si, Ag, W, Sb, Sr, Ti, Th, Zn, Zr, or a combination comprising at least one of the foregoing,
an inorganic oxide-based polymer, the inorganic oxide-based polymer comprising a plurality of structural repeating units which comprise —(X—O)— where X is Si, Al, P, or a combination comprising at least one of the foregoing, and
a solvent,
the cure product having a network structure.

17. A network material, comprising:
a cure product of:
a metallic composition comprising a particle having a core surrounded by a shell, the core comprising a magnesium alloy and the shell comprising aluminum metal, the magnesium alloy comprising magnesium metal alloyed with Al, Cd, Ca, Co, Cu, Fe, K, Li, Mn, Na, Ni, Si, Ag, W, Sb, Sr, Ti, Th, Zn, Zr, or a combination comprising at least one of the foregoing,
an inorganic oxide-based polymer, the inorganic oxide-based polymer comprising a plurality of structural repeating units which comprise —(X—O)— where X is Si, Al, P, or a combination comprising at least one of the foregoing, and
a solvent,
the cure product having a network structure.

18. A method for forming a material having a network structure, the method comprising:
disposing a composition in an environment, the composition comprising:
a metallic composition comprising a particle having a core surrounded by a shell, the core comprising a magnesium alloy and the shell comprising a metallic or ceramic layer not identical to the magnesium alloy, the magnesium alloy comprising magnesium metal alloyed with Al, Cd, Ca, Co, Cu, Fe, K, Li, Mn, Na, Ni, Si, Ag, W, Sb, Sr, Ti, Th, Zn, Zr, or a combination comprising at least one of the foregoing; and
an inorganic oxide-based polymer, the inorganic oxide-based polymer comprising a plurality of structural repeating units which comprise —(X—O)— where X is Si, Al, P, or a combination comprising at least one of the foregoing;
disposing a solvent in the environment;
contacting the composition with the solvent; and
curing the composition to form the material having a network structure, the material comprising the cross-linked product of the inorganic oxide-based polymer.

19. The method of claim 18, wherein the environment is a downhole environment, surface environment, building environment, aquatic environment, or a combination comprising at least one of the foregoing environments.

20. The composition of claim 1, wherein the magnesium alloy further comprises greater than zero and less than or equal to about 0.5 wt. % of nickel.

21. The composition of claim 1, wherein the magnesium alloy has a corrosion rate of 0.1 to about 200 mg/cm$^2$/hour determined in aqueous 3 wt % KCl solution at 200° F.

22. The composition of claim 1, wherein the solvent comprises an alcohol, a water-miscible polar aprotic solvent, an ionic liquid, or a combination comprising at least one of the foregoing.

23. The composition of claim 17, wherein the shell further comprises aluminum oxide, magnesium oxide, or a combination comprising at least one of the foregoing.

24. The composition of claim 17, wherein the magnesium alloy has a corrosion rate of 0.1 to about 200 mg/cm$^2$/hour determined in aqueous 3 wt % KCl solution at 200° F.

25. The composition of claim 17, wherein the magnesium alloy further comprises greater than zero and less than or equal to about 0.5 wt. % of nickel.

26. The composition of claim 17, wherein the solvent comprises an alcohol, a water-miscible polar aprotic solvent, an ionic liquid, or a combination comprising at least one of the foregoing.

* * * * *